United States Patent
Yamaguchi

(10) Patent No.: US 9,808,719 B2
(45) Date of Patent: Nov. 7, 2017

(54) VIDEO GAME AWARDING BENEFITS FOR QUALIFIED RESOURCE FUSION

(71) Applicant: DeNA Co., Ltd., Tokyo (JP)

(72) Inventor: Kyohei Yamaguchi, Tokyo (JP)

(73) Assignee: DeNA CO., LTD., Tokyo (JP)

( * ) Notice: Subject to any disclaimer, the term of this patent is extended or adjusted under 35 U.S.C. 154(b) by 523 days.

(21) Appl. No.: 14/531,095

(22) Filed: Nov. 3, 2014

(65) Prior Publication Data

US 2015/0174494 A1 Jun. 25, 2015

(30) Foreign Application Priority Data

Dec. 20, 2013 (JP) .................................. 2013-264152

(51) Int. Cl.
- *A63F 13/63* (2014.01)
- *A63F 9/24* (2006.01)
- *A63F 13/69* (2014.01)
- *A63F 13/825* (2014.01)
- *A63F 13/58* (2014.01)

(52) U.S. Cl.
CPC .............. *A63F 13/69* (2014.09); *A63F 13/58* (2014.09); *A63F 13/825* (2014.09)

(58) Field of Classification Search
None
See application file for complete search history.

(56) References Cited

FOREIGN PATENT DOCUMENTS

| JP | 5153960 B | 12/2012 |
| JP | 5204330 B | 2/2013 |
| JP | 2013-070969 A | 4/2013 |

OTHER PUBLICATIONS

Japanese Patent Application No. 2013-264152: Office Action dated Apr. 22, 2014.

*Primary Examiner* — Lawrence Galka
(74) *Attorney, Agent, or Firm* — Procopio, Cory, Hargreaves & Savitch LLP

(57) ABSTRACT

The information processing device according to the present invention is provided with a fusion processing unit which, before satisfying a preset condition related to fusing a basic first game content and a second game content used as source material for fusion, varies parameters configured in the first game content each time the second game content is fused with the first game content, and, once the preset condition is satisfied, provides benefits, without varying the parameters configured in the first game content, each time the second game content is fused with the first game content.

8 Claims, 12 Drawing Sheets

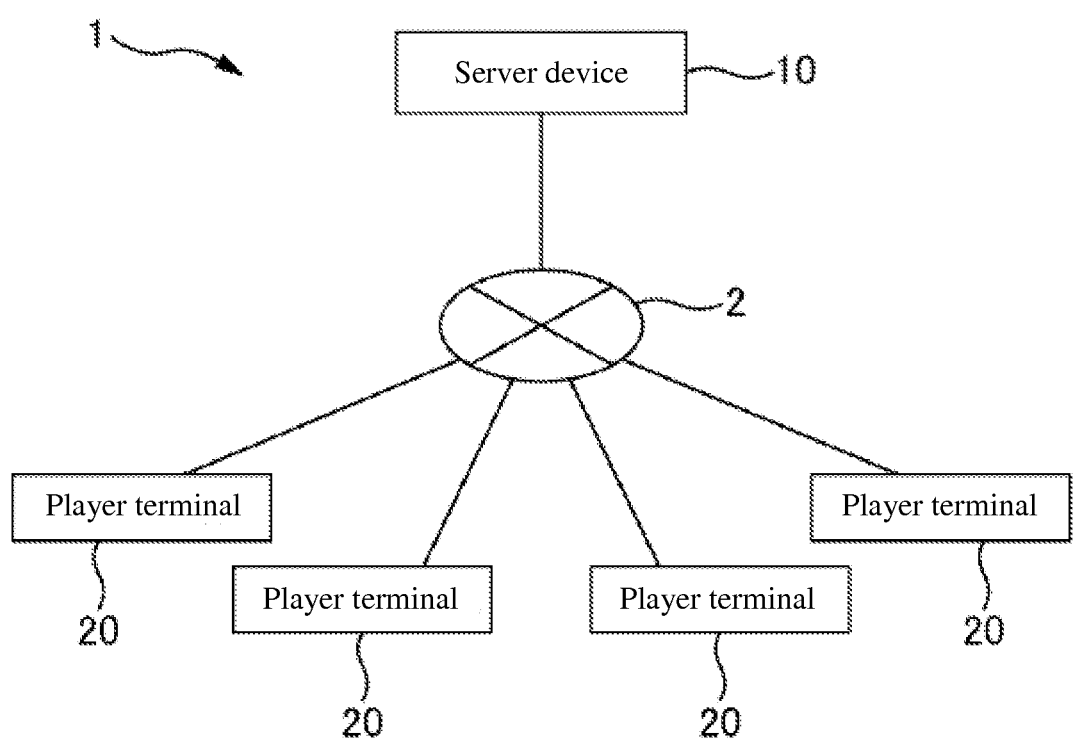
[FIG. 1]

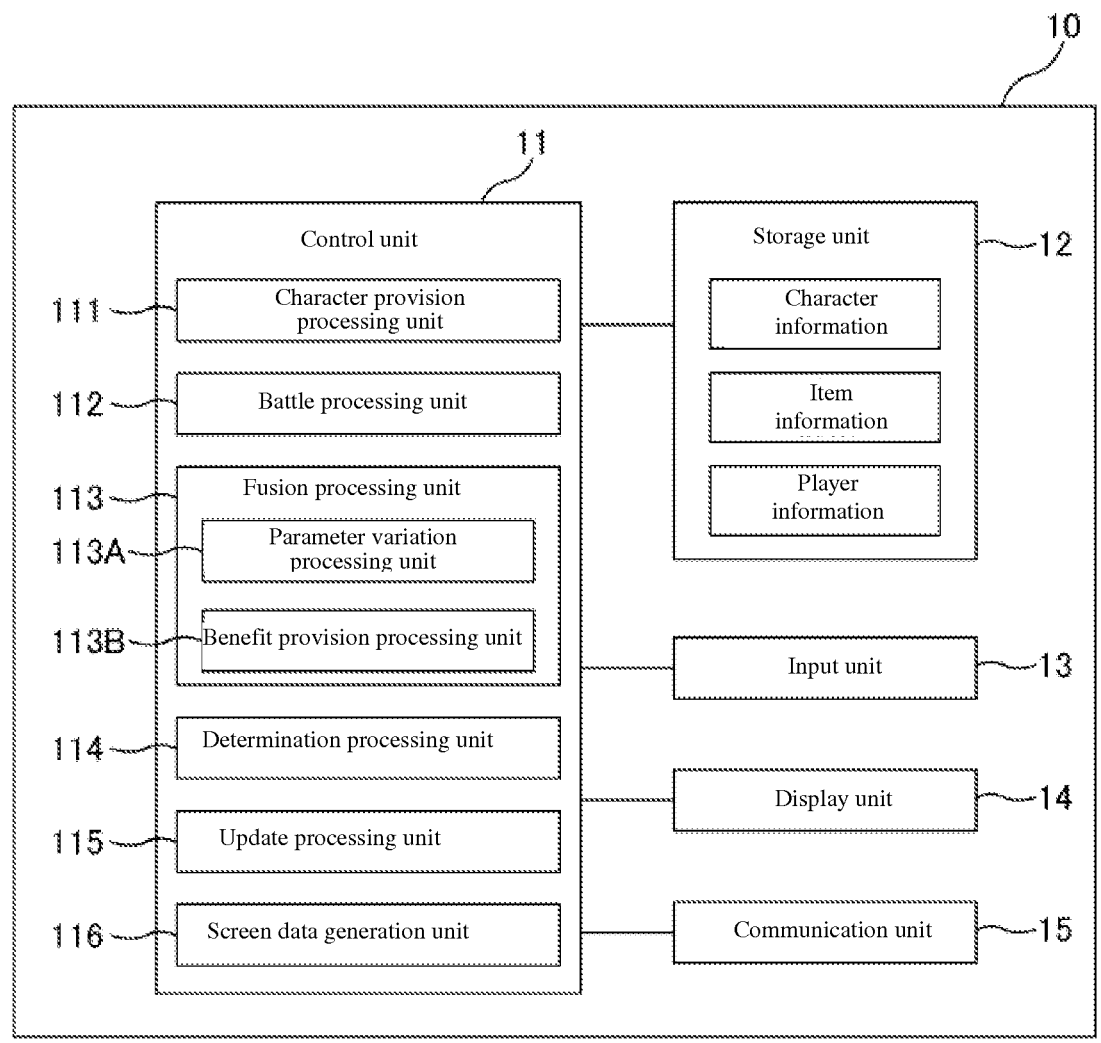
[FIG. 2]

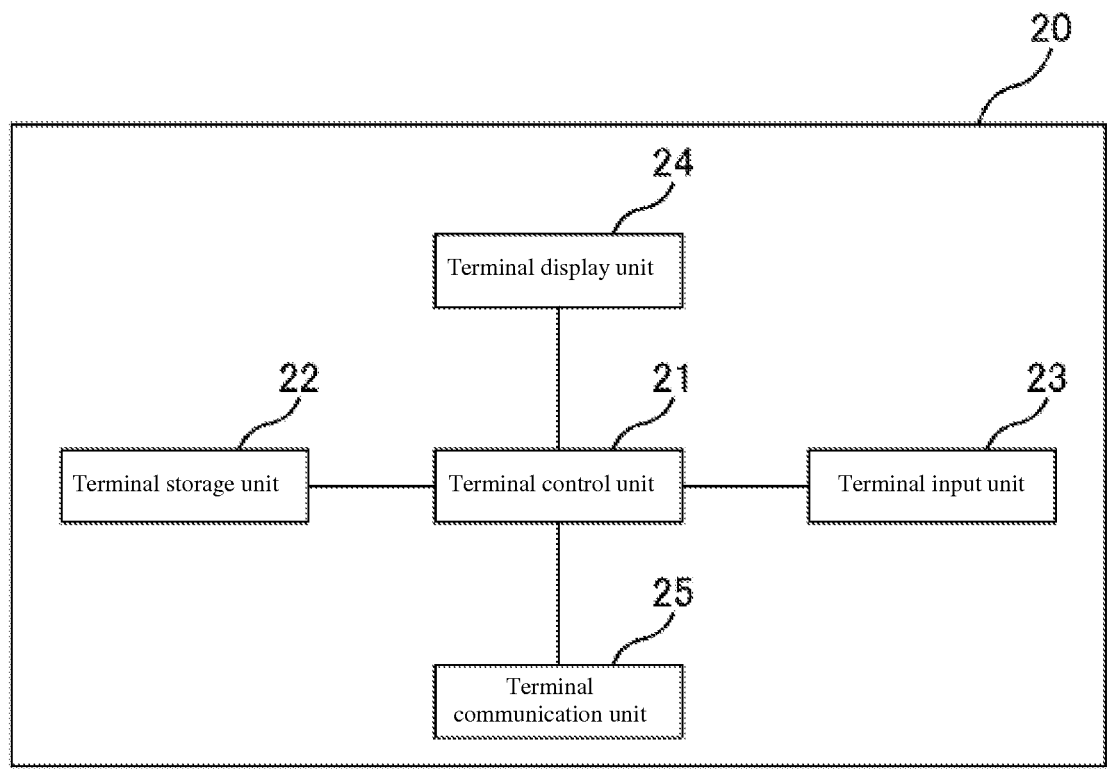
[FIG. 3]

| Character ID | Character Name | Character Image | Rarity | Initial Attack Power | Initial Defense Power | Initial Physical Strength | Initial Upper Attack Power Limit | Initial Upper Defense Power Limit | Initial Upper Physical Strength Limit |
|---|---|---|---|---|---|---|---|---|---|
| 0001 | Character A | | Common | 15 | 8 | 10 | 100 | 100 | 100 |
| 0002 | Character B | | Uncommon | 30 | 20 | 15 | 300 | 300 | 300 |
| 0003 | Character C | | Rare | 45 | 30 | 25 | 600 | 600 | 600 |
| 0004 | Character D | | Super-rare | 60 | 55 | 60 | 1000 | 1000 | 1000 |
| . | . | . | . | . | . | . | . | . | . |

| 2nd Upper Attack Power Limit | 2nd Upper Defense Power Limit | 2nd Upper Physical Strength Limit | 3rd Upper Attack Power Limit | 3rd Upper Defense Power Limit | 3rd Upper Physical Strength Limit |
|---|---|---|---|---|---|
| 120 | 120 | 120 | 150 | 150 | 150 |
| 320 | 320 | 320 | 350 | 350 | 350 |
| 650 | 650 | 650 | 700 | 700 | 700 |
| 1100 | 1100 | 1100 | 1200 | 1200 | 1200 |
| . | . | . | . | . | . |

[FIG. 4]

| Item ID | Item Name |
|---|---|
| 0001 | Item A |
| 0002 | Item B |
| 0003 | Item C |
| . | . |
| . | . |
| . | . |

[FIG. 5]

| Player ID | Virtual Medals | Automatic Fusion Configuration | Proprietary Character Information | Proprietary Item Information |
|---|---|---|---|---|
| 1 | 59 | ON | Proprietary Character Information (1) | Proprietary Item Information (1) |
| 2 | 20 | ON | Proprietary Character Information (2) | Proprietary Item Information (2) |
| 3 | 100 | OFF | Proprietary Character Information (3) | Proprietary Item Information (3) |
| 4 | 0 | OFF | Proprietary Character Information (4) | Proprietary Item Information (4) |
| 5 | 10 | ON | Proprietary Character Information (5) | Proprietary Item Information (5) |
| 6 | 150 | OFF | Proprietary Character Information (6) | Proprietary Item Information (6) |
|   |   |   | . | . |
|   |   |   | . | . |
|   |   |   | . | . |

[FIG. 6]

| | Proprietary Character Information (3) | | | | | | | | | |
|---|---|---|---|---|---|---|---|---|---|---|
| | Proprietary Character Information (2) | | | | | | | | | |
| Proprietary Character Information (1) | | | | | | | | | | 0 |
| Character ID | Attack Power | Defense Power | Physical Strength | Upper Attack Power Limit | Upper Defense Power Limit | Upper Physical Strength Limit | frequency of fusion | 0 | 0 | |
| 0011 | 15 | 10 | 200 | 200 | 200 | 200 | 0 | 0 | 0 | |
| 0211 | 20 | 23 | 150 | 150 | 150 | 150 | 0 | 0 | 1 | |
| 0133 | 70 | 45 | 100 | 100 | 200 | 100 | 0 | 1 | 0 | |
| 0201 | 22 | 40 | 600 | 500 | 600 | 700 | 1 | 0 | 3 | |
| 0072 | 60 | 50 | 250 | 200 | 200 | 300 | 0 | 3 | | |
| 0094 | 300 | 200 | 450 | 600 | 600 | 600 | 3 | | | |
| . . | . | . | . | . | . | . | . | | | |
| . . | . | . | . | . | . | . | . | | | |
| . . | . | . | . | . | . | . | . | | | |

[FIG. 7]

| Proprietary Item Information (3) | |
|---|---|
| Proprietary Item Information (2) | |
| Proprietary Item Information (1) | |
| Item ID | Number of Items Owned |
| 0001 | 20 |
| 0002 | 10 |
| 0003 | 1 |
| ⋮ | ⋮ |
[FIG. 8]
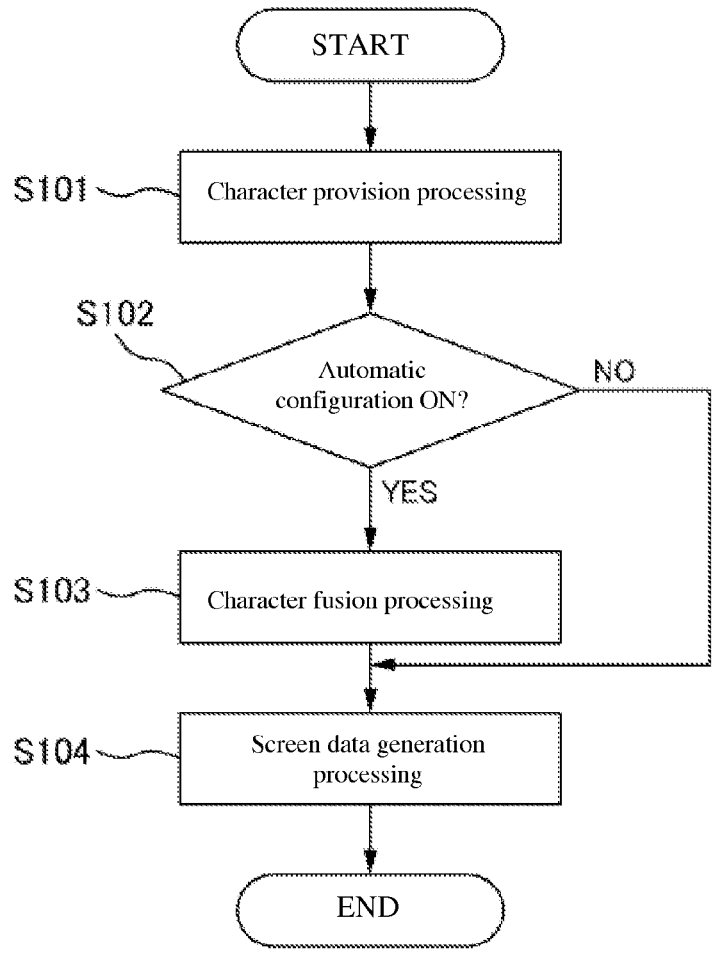
[FIG. 9]

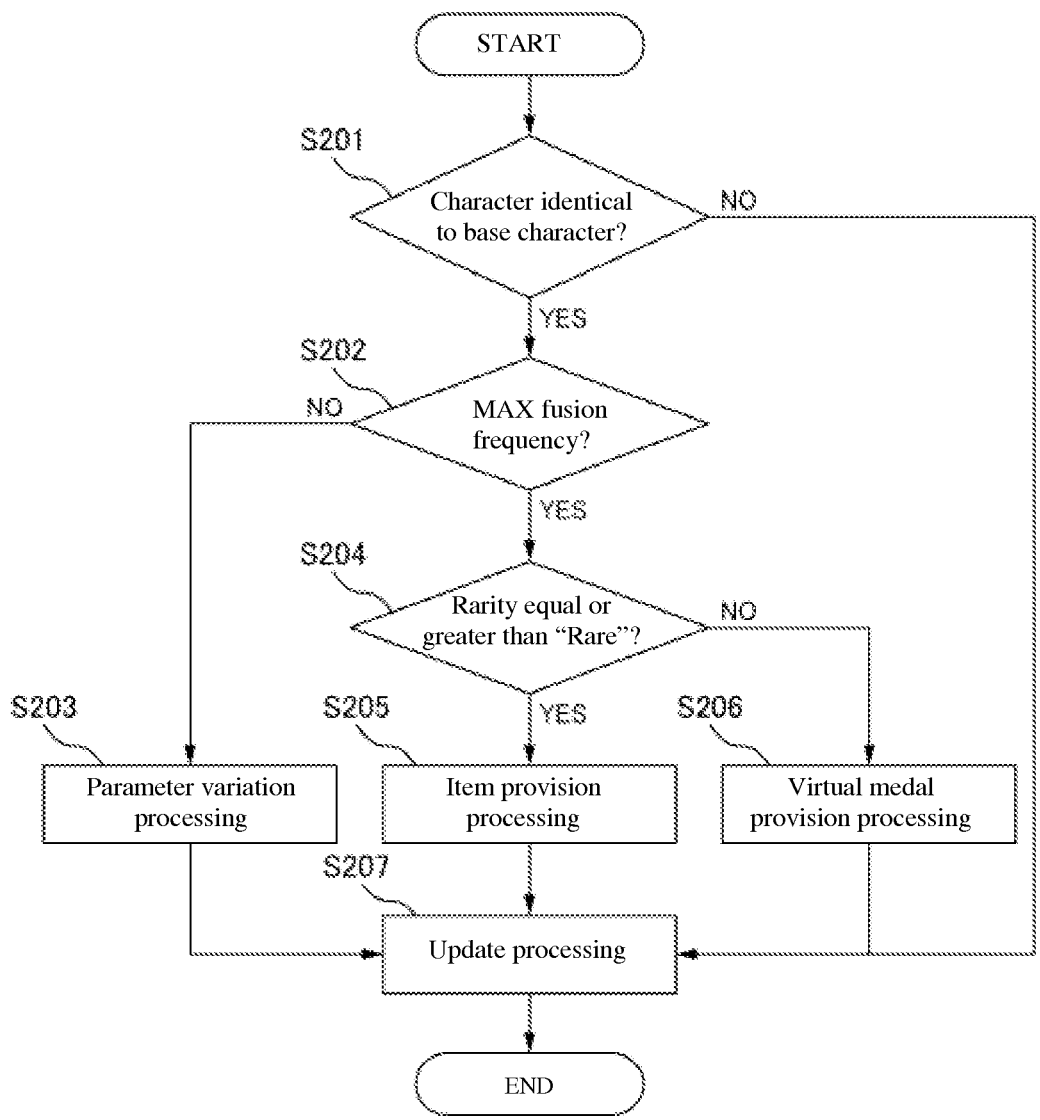
[FIG. 10]

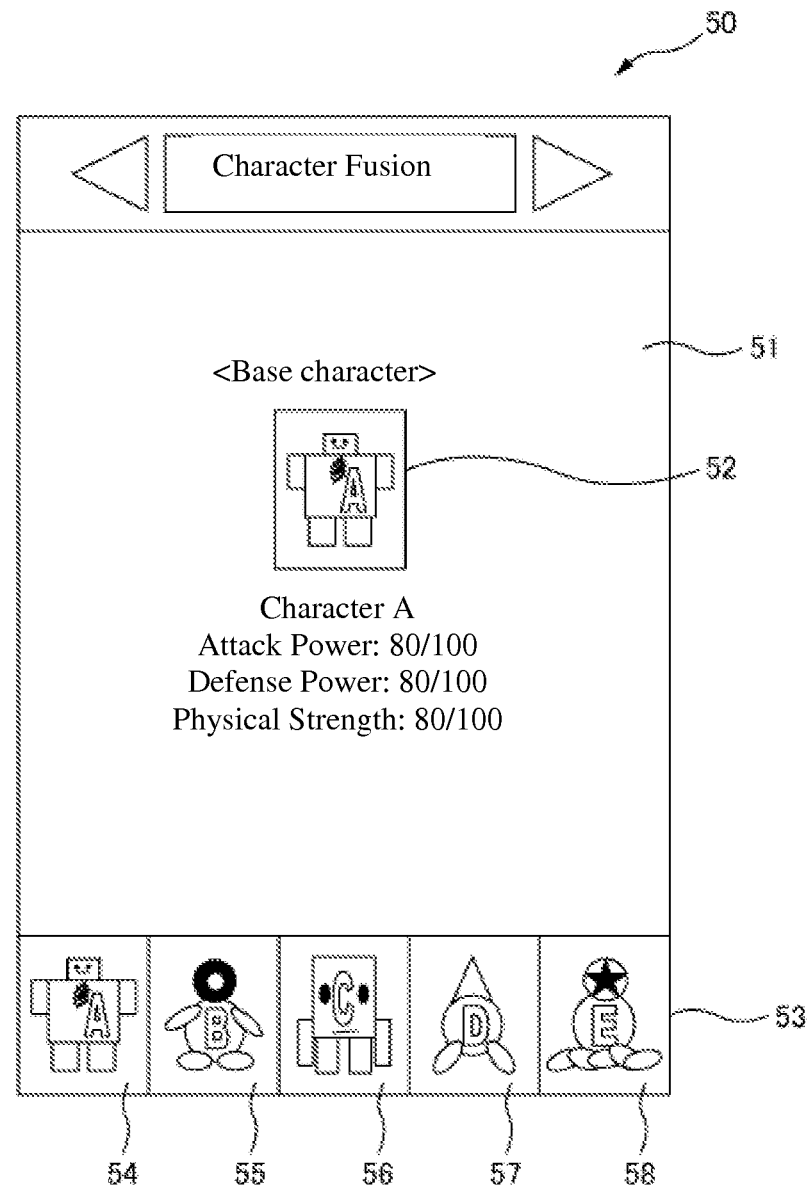
[FIG. 11]

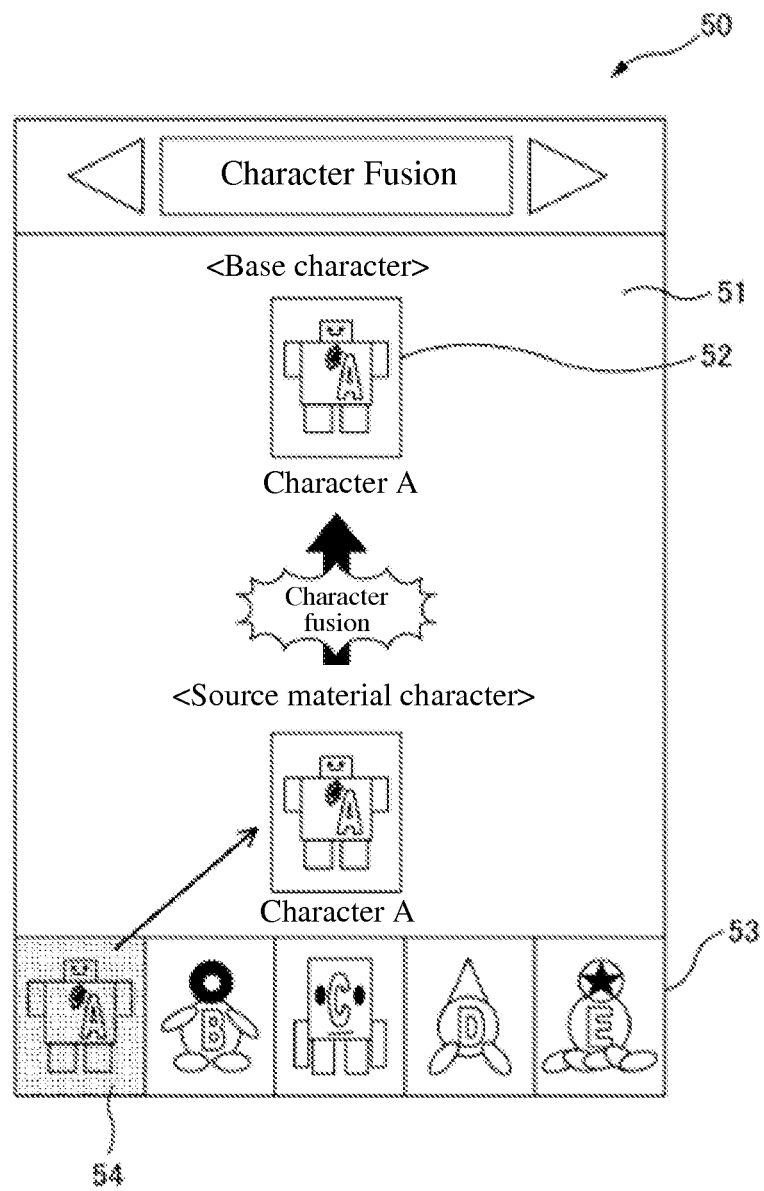
[FIG. 12]

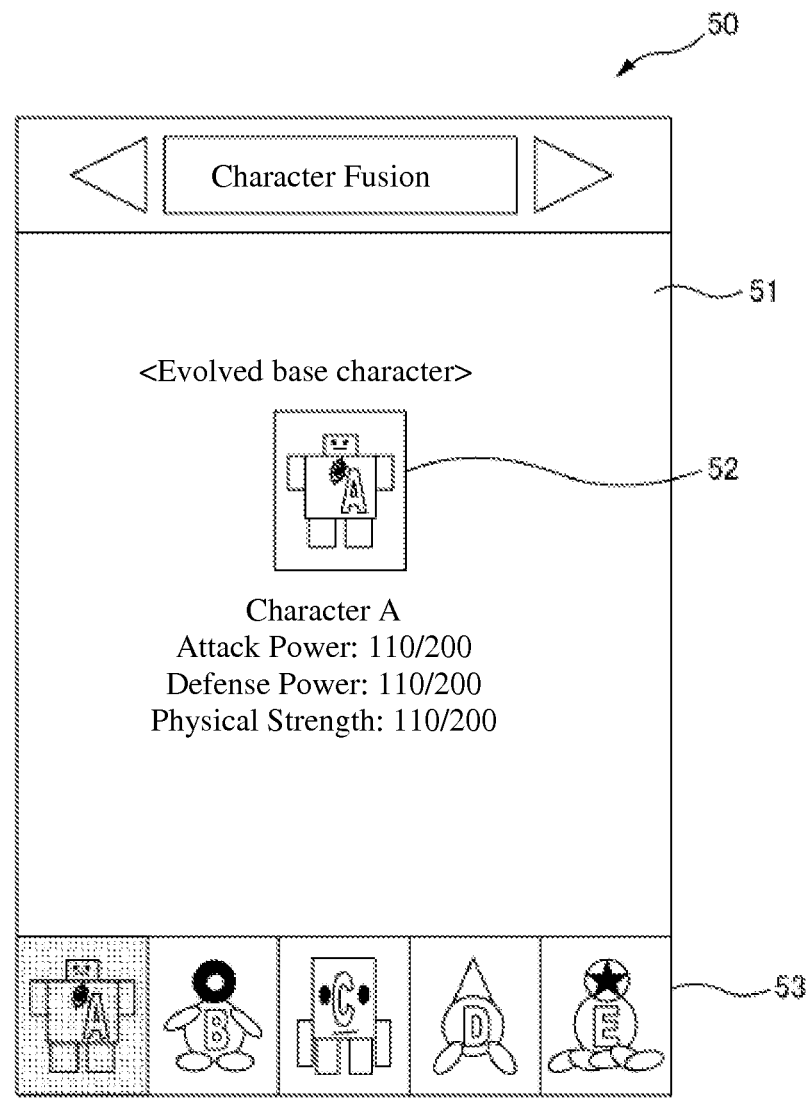
[FIG. 13]

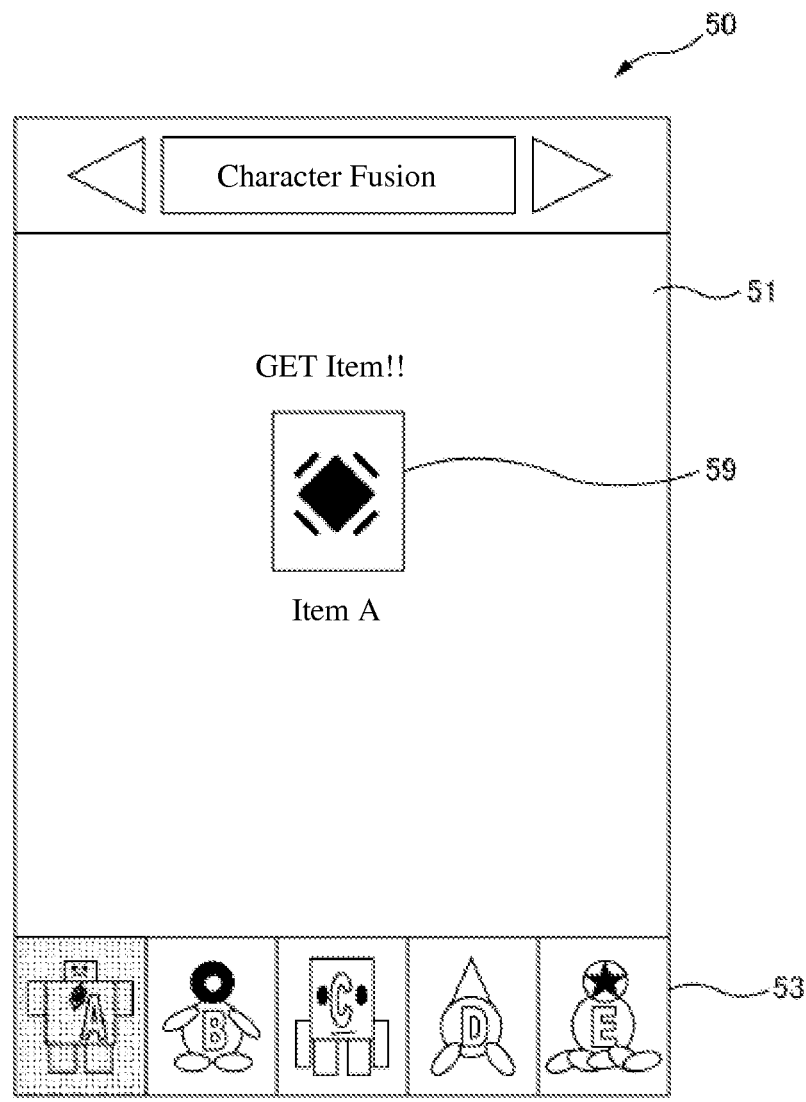
[FIG. 14]

VIDEO GAME AWARDING BENEFITS FOR QUALIFIED RESOURCE FUSION

The present application claims the benefit of foreign priority under 35 USC 119 based on Japanese Patent Application No. 2013-264152, filed Dec. 20, 2013, the contents of which is incorporated herein by reference in its entirety.

TECHNICAL FIELD

The present invention relates to an information processing device and a game program.

BACKGROUND ART

Game systems are known, in which parameters configured in basic game content are varied by fusing the basic game content with game content used as source material for fusion (for example, see Patent Document 1).

PRIOR ART DOCUMENTS

Patent Documents

[Patent Document 1]
Japanese Patent Publication No. 5204330

SUMMARY OF THE INVENTION

Problems to be Solved by the Invention

Although in such game systems parameters configured in the basic game content can be continuously varied each time the game content used as source material for fusion is fused with the basic game content, there is a certain limit to that. Since further parameter variation based on game content fusion becomes impossible once the limit is attained, the advantages of repeated fusion are diminished.

The present invention has been devised by taking such circumstances into consideration, and it is an object of the invention to increase the advantages of repeatedly performing game content fusion.

Means for Solving the Problems

The main inventive idea of the present invention, which intends to resolve the above-mentioned problem, is an information processing device provided with: a determination processing unit, which determines whether or not a preset condition related to fusing a basic first game content and a second game content used as source material for fusion has been satisfied; a fusion processing unit which, before the preset condition is satisfied, varies parameters configured in the first game content each time the second game content is fused with the first game content, and, once the preset condition is satisfied, provides benefits, without varying the parameters configured in the first game content, each time the second game content is fused with the first game content.

Other features of the present invention will become apparent from this description and the accompanying drawings.

BRIEF DESCRIPTION OF THE DRAWINGS

FIG. 1 A diagram showing an example configuration of the entire game system 1.

FIG. 2 A block diagram showing the functional configuration of the server device 10.

FIG. 3 A block diagram showing the functional configuration of the player terminal 20.

FIG. 4 A diagram showing an example data structure of character information.

FIG. 5 A diagram showing an example data structure of item information.

FIG. 6 A diagram showing an example data structure of player information.

FIG. 7 A diagram showing an example data structure of proprietary character information.

FIG. 8 A diagram showing an example data structure of proprietary item information.

FIG. 9 A flow chart used to illustrate an example of operation of the game system 1.

FIG. 10 A flow chart used to illustrate character fusion processing.

FIG. 11 A diagram showing an example of the game screen 50 prior to character fusion.

FIG. 12 A diagram showing an example of the game screen 50 showing how characters are fused.

FIG. 13 A diagram showing an example of the game screen 50 after character fusion.

FIG. 14 A diagram showing an example of the game screen 50 after item provision.

MODE FOR CARRYING OUT THE INVENTION

At least the following will become apparent from this description and the accompanying drawings.

Namely, this is an information processing device provided with: a determination processing unit, which determines whether or not a preset condition related to fusing a basic first game content and a second game content used as source material for fusion has been satisfied; and a fusion processing unit which, before the preset condition is satisfied, varies parameters configured in the first game content each time the second game content is fused with the first game content, and, once the preset condition is satisfied, provides benefits, without varying the parameters configured in the first game content, each time the second game content is fused with the first game content.

In such an information processing device, since the advantages of fusing game content can be continuously provided to the player before and after the preset condition is satisfied, it becomes possible to increase the advantages of repeatedly performing game content fusion.

Further, in such an information processing device, the determination processing unit may be adapted to determine whether or not it is possible to fuse the second game content with the first game content and, based on the results of the determination, determine whether or not the preset condition has been satisfied.

In such an information processing device, since processing starts by making a determination as to whether or not it is possible to fuse the second game content with the first game content, if fusion is impossible, subsequent processing to determine whether or not the preset condition has been satisfied can be omitted.

In addition, in such an information processing device, the fusion processing unit may be adapted such that, before the preset condition is satisfied, the upper limit of the parameters configured in said first game content is varied in a stepwise manner each time game content that is identical to said first game content is fused, as the second game content, with the first game content.

In such an information processing device, even if identical game content is repeatedly provided to the player, the first game content can be caused to grow in a stepwise manner and, therefore, it becomes possible to increase the advantages of repeatedly performing the fusion of identical game content.

In addition, in such an information processing device, the fusion processing unit may be adapted such that, once the preset condition is satisfied, benefits based on properties configured in the second game content are provided each time the second game content is fused with the first game content.

In such an information processing device, the properties of the second game content can be applied when game content fusion is repeated.

In addition, in such an information processing device, the fusion processing unit may be adapted such that different benefits are provided depending on the class of rarity configured in the second game content.

In such an information processing device, the motivation to repeatedly fuse game content can be maintained because the benefits provided to the player by the properties of the second game content may be different.

In addition, in such an information processing device, there is further provided a game content provision processing unit providing game content selected from multiple types of game content, the determination processing unit determines whether or not the preset condition has been satisfied when the game content is provided by the game content provision processing unit, and the fusion processing unit automatically varies parameters configured in the first game content if it is determined by the determination processing unit that the preset condition has not been satisfied and automatically provides benefits if it is determined by the determination processing unit that the preset condition has been satisfied.

In such an information processing device, the time the player requires for operation input can be reduced because the advantages of game content fusion are automatically provided before or after the preset condition is satisfied as soon as the game content is provided.

Further, this information processing device may be adapted such that the preset condition consists in the fact that the frequency of fusion, at which the first game content and the second game content have been fused, has reached a predetermined frequency, or in the fact that the upper limit of the parameters configured in the first game content have reached a cap value.

In such an information processing device, imposing restrictions on the frequency of fusion and the upper limits of the parameters allows for control to be exercised such that the parameters configured in the first game content are not subject to excessive variation.

Further, this is game program directing a computer to carry out: determination processing, during which it is determined whether or not a preset condition related to fusing a basic first game content and a second game content used as source material for fusion has been satisfied; and fusion processing during which, before the preset condition is satisfied, parameters configured in the first game content are varied each time the second game content is fused with the first game content, and, once the preset condition is satisfied, benefits are provided, without varying the parameters configured in the first game content, each time the second game content is fused with the first game content.

In such a game program, it becomes possible to increase the advantages of repeatedly performing game content fusion.

Embodiments

<<Configuration of Game System 1>>

FIG. 1 is a diagram showing an example configuration of the entire game system 1 according to the present embodiment. The game system 1 provides various game-related services to the player over a network 2 (for example, the Internet) and includes a server device 10 and multiple player terminals 20.

<Configuration of Server Device 10>

FIG. 2 is a block diagram showing the functional configuration of the server device 10 according to the present embodiment. When the server device 10, which is an information processing device (e.g., a workstation, a personal computer, etc.) used by a system administrator, or the like, to operate and manage gaming services, receives various types of commands (requests) from the player terminals 20, it can distribute (respond with) game programs operational on the player terminals 20 and web pages (game screens, etc.) created in a markup language (HTML, etc.) adapted to the specifications of the player terminals 20. This server device 10 has a control unit 11, a storage unit 12, an input unit 13, a display unit 14, and a communication unit 15.

The control unit 11, along with transferring data between the components, exercises overall control over the server device 10, and is implemented using a CPU (Central Processing Unit) that runs a predetermined program stored in memory. The control unit 11 of the present embodiment is equipped with a character provision processing unit 111, a battle processing unit 112, a fusion processing unit 113, a determination processing unit 114, an update processing unit 115, and a screen data generation unit 116.

The character provision processing unit 111, which is an example of a game content provision processing unit, possesses functionality to carry out processing during which characters, which constitute an example of game content, are provided to players. The game content is represented by electronic game data, for example, characters, as well as game cards and figures with which the characters etc. are associated, or items such as tools, abilities, or the like used in the game.

The battle processing unit 112 possesses functionality to carry out various types of battle game-related processing. The battle processing unit 112 according to the present embodiment carries out processing to decide the winner of a battle between a player character and an enemy character.

The fusion processing unit 113 possesses functionality to carry out various types of processing related to game content fusion. The fusion of game content consists in fusing game content used as source material for fusion (hereinafter referred to as "source material content") with basic game content (hereinafter referred to as "base content"), thereby continuously placing the fused basic game content in the player's possession without allowing the player to acquire the game content used as source material for fusion. The fusion processing unit 113 of the present embodiment has a parameter variation processing unit 113A and a benefit provision processing unit 113B.

The parameter variation processing unit 113A possesses functionality to carry out processing for varying parameters configured in game content. For example, the parameter variation processing unit 113A of the present embodiment increases a parameter value configured in the base content up to an upper limit or increases the upper limit of this parameter.

The benefit provision processing unit 113B possesses functionality to carry out processing for providing a benefit to the player. For example, the benefit provision processing unit 113B of the present embodiment provides a benefit based on properties configured in the source material content. This "benefit" consists in offering a game service advantageous to the player, for example, providing the player with game items (e.g., items used to enhance the base content), or virtual medals (virtual currency that can be used in the game space).

The determination processing unit 114 possesses functionality to carry out various types of determination processing. For example, the determination processing unit 114 according to the present embodiment determines whether a preset condition related to fusing the base content and the source material content has been satisfied. For example, this preset condition is that the frequency of fusion of the base content with the source material content has reached a predetermined frequency.

The update processing unit 115 possesses functionality to carry out processing used to update various types of information stored in the storage unit 12. For example, the update processing unit 115 according to the present embodiment updates the records of player information stored in the storage unit 12 depending on whether the player still owns or no longer owns the game content.

The screen data generation unit 116 possesses functionality to carry out processing used to generate screen data for displaying a game screen on a player terminal 20. The screen data generation unit 116 of the present embodiment generates HTML data as screen data corresponding to a game screen.

The storage unit 12 has a ROM (Read Only Memory), which is a read-only storage area where operating system software is stored, and a RAM (Random Access Memory), which is a rewritable storage area used as a work area for arithmetic processing by the control unit 11, and is implemented as a non-volatile storage device, such as a flash memory, a hard disk, or the like. The storage unit 12 of the present embodiment stores at least character information, i.e. character-related information, item information, i.e. item-related information, and player information, i.e. player-related information. It should be noted that each of these information elements will be described in more detail below.

The input unit 13, which is used by a system administrator etc. to enter various types of data (e.g., character information, etc.), is implemented, for example, as a keyboard, a mouse, or the like.

The display unit 14, which is used to display an operation screen for a system administrator in response to a command from the control unit 11, is implemented, for example, as a liquid crystal display (LCD: Liquid Crystal Display), or the like.

The communication unit 15, which is used for communication with the player terminals 20, has receiver functionality for receiving various types of data and signals transmitted from the player terminals 20 and transmitter functionality for transmitting various types of data and signals to the player terminals 20 in response to a command from the control unit 11. The communication unit 15 is implemented, for example, as an NIC (Network Interface Card), or the like.

<Configuration of Player Terminal 20>

FIG. 3 is a block diagram showing the functional configuration of a player terminal 20. The player terminal 20 of the present embodiment, which is an information processing device the player uses during game play (e.g., a mobile phone terminal, a smart phone, a tablet type terminal, etc.), can transmit delivery requests regarding various types of game-related information (game programs, web pages, etc.) to the server device 10. Since the player terminal 20 has web browser functionality for allowing the player to view web pages, it can display web pages delivered by the server device 10 (game screens, etc.). This player terminal 20 has a terminal control unit 21, a terminal storage unit 22, a terminal input unit 23, a terminal display unit 24, and a terminal communication unit 25.

The terminal control unit 21, along with transferring data between the components, exercises overall control over the player terminal 20 and is implemented using a CPU (Central Processing Unit) that runs a predetermined program stored in memory. It should be noted that the terminal control unit 21 of the present embodiment also operates as a screen view control unit controlling the display of the game screens shown on the terminal display unit 24. The terminal storage unit 22, which is connected to the terminal control unit 21 across a bus, carries out processing for looking up, reading out, and re-writing stored data in response to commands from the terminal control unit 21. This terminal storage unit 22 is implemented, for example, as a flash memory, a hard disk, or the like. The terminal input unit 23, which is used by the player to perform various operations (game operations, etc.), is implemented, for example, in the form of control buttons, a touch panel, or the like. The terminal display unit 24, which is used to display a game screen in response to a command from the terminal control unit 21, is implemented, for example, in the form a liquid crystal display (LCD: Liquid Crystal Display) or the like. The terminal communication unit 25, which operates as a transceiver unit for transmitting and receiving various types of information to and from the server device 10 over a network 2, is implemented, for example, as an NIC (Network Interface Card) or the like.

<Data Structure>

FIG. 4 is a diagram showing an example data structure of the character information stored in the storage unit 12 of the server device 10. This character information has elements (fields) such as Character ID, Character Name, Character Image, Rarity, Initial Attack Power, Initial Defense Power, Initial Physical Strength, Initial Upper Attack Power Limit, Initial Upper Defense Power Limit, Initial Upper Physical Strength Limit, $2^{nd}$ Upper Attack Power Limit, $2^{nd}$ Upper Defense Power Limit, $2^{nd}$ Upper Physical Strength Limit, $3^{rd}$ Upper Attack Power Limit, $3^{rd}$ Upper Defense Power Limit, and $3^{rd}$ Upper Physical Strength Limit. Character ID represents identification information identifying a character. Character Name represents information indicating the display name of the character. Character Image represents image data for the character. Rarity represents information indicating scarcity classified into multiple classes depending on the scarcity value of the character. In the present embodiment, Rarity configured in a character is classified into 4 tiered classes ("Common">"Uncommon">"Rare">"Super-rare"). Initial Attack Power, Initial Defense Power, and Initial Physical Strength are parameters (capability values) related to the capabilities initially configured in the character. Initial Upper Attack Power Limit, Initial Upper Defense Power Limit, and Initial Upper Physical Strength Limit are upper limit values configured initially (in Tier 1) in the capability parameters of the character. $2^{nd}$ Upper Attack Power Limit, $2^{nd}$ Upper Defense Power Limit, and $2^{nd}$ Upper Physical Strength Limit are upper limit values configured in Tier 2 in the capability parameters of the character. $3^{rd}$ Upper Attack Power Limit, $3^{rd}$ Upper Defense Power Limit, and $3^{rd}$ Upper Physical Strength Limit are upper limit values (cap values) configured in Tier 3 in the capability parameters of the character. In this manner, in the present embodiment, there are three upper limit values configured in a stepwise manner for the capability parameters of the character.

FIG. 5 is a diagram showing an example data structure of item information stored in the storage unit 12 of the server device 10. This item information has elements such as Item ID, Item Name, or the like. Item ID represents identification information identifying an item. Item Name represents information indicating the display name of an item.

FIG. 6 is a diagram showing an example data structure of the player information stored in the storage unit 12 of the server device 10. This player information has elements such as Player ID, Virtual Medals, Automatic Fusion Configuration, Proprietary Character Information, and Proprietary Item Information. Player ID represents identification information identifying a player. Virtual Medals represent information indicating the amount of virtual medals, as an example of the game values that the player has. In the course of the game, the player can acquire virtual medals and can also vary and enhance the parameters of the character using these virtual medals. Automatic Fusion Configuration represents information indicating the configuration status of automatic fusion used to automatically perform character fusion. If, as a result of the player's operations, the automatic fusion configuration is set to ON, then automatic character fusion is enabled, and if it is set to OFF, then automatic character fusion is disabled. Proprietary Character Information represents information that indicates characters belonging to a player (hereinafter referred to as "proprietary characters"). Proprietary Item Information represents information that indicates game items belonging to a player (hereinafter referred to as "proprietary items").

FIG. 7 is a diagram showing an example data structure of proprietary character information. This proprietary character information has elements such as Character ID, Attack Power, Defense Power, Physical Strength, Upper Attack Power Limit, Upper Defense Power Limit, Upper Physical Strength Limit, and Frequency of Fusion. Character ID represents identification information identifying a proprietary character. The Attack Power, Defense Power, and Physical Strength of a proprietary character are parameter values configured in the proprietary character at the present time (current values). The Upper Attack Power Limit, Upper Defense Power Limit, and Upper Physical Strength Limit of the character represent information indicating the current upper limit values of the parameters configured in the proprietary character. These various parameters are updated as the game progresses. Frequency of Fusion represents information indicating the number of times character fusion has been performed.

FIG. 8 is a diagram showing an example data structure of the proprietary item information. This proprietary item information has elements such as Item ID and Number Owned. Item ID represents identification information identifying the various items the player owns. Number Owned represents information indicating the quantity of the items the player owns.

<<Game Overview>>

An overview of the game provided by the game system 1 of the present embodiment is provided below. In this game system 1, various games are provided using electronic game cards having game characters associated therewith (virtual cards used in the game; referred also to as simply as "characters" below).

<Battle Games>

In the game system 1 of the present embodiment, a player can own multiple characters. A player can conduct a battle game using the player characters in his or her possession. Specifically, the battle processing unit 112 decides on the enemy character to be used as the player's opponent and decides the winner of a battle between these two characters based on various parameters configured in the player character and enemy character (Attack Power, Defense Power, Physical Strength, etc.). If the player wins the battle with the enemy character, the items that belong to the enemy character, as well as the enemy character itself, are awarded to the player.

<Lottery Games>

In the game system 1 according to the present embodiment, the player can conduct lottery games called "Gacha games" (registered trademark). In the lottery games, a character selected from among multiple characters is provided to the player. The lottery games include ordinary lottery games and special lottery games. In an ordinary lottery game, a single character is provided to the player when a single lottery drawing is conducted. In contrast, in a special lottery game, multiple characters are provided to the player at once when a single lottery drawing is conducted. The player can selectively conduct either ordinary lottery games or special lottery games. By repeatedly conducting such lottery games, the player can increase the number of characters in his or her possession until a maximum number is reached. The player can then conduct the above-described battle game using the characters in his or her possession.

<Character Fusion>

In the game system 1 of the present embodiment, the player can perform character fusion by combining a character used as source material for fusion (hereinafter referred to as "source material character") with a basic character selected from among the multiple characters in his or her possession (hereinafter referred to as "base character").

In the present embodiment, the advantages that can be provided to the player by character fusion are different before and after the preset condition regarding character fusion is satisfied. In the discussion below, it is assumed that the preset condition related to character fusion is that the number of times character fusion has been performed (frequency of fusion) has reached a predetermined frequency.

First of all, if the base character and the source material character are the same characters before the frequency of fusion reaches the predetermined frequency, fusing this source material character with the base character causes the upper limit value of the parameters configured in the base character before fusion to increase and be reconfigured in the fused base character such that the values of these parameters can rise above the upper limit. If character fusion is performed in this manner, then the player cannot own both the base character and the source material character and can only own the base character obtained after being enhanced by fusion.

In addition, if character fusion is repeated until the frequency of fusion reaches the predetermined frequency, the upper limit values of the parameters configured in the base character increase in a stepwise manner. In the present embodiment, as shown in the character information of FIG. 4, the frequency of fusion is restricted to 3 times, and therefore, if character fusion is repeated 3 times, the upper limit values of the parameters configured in the base character reach a cap value, such that even if character fusion is repeated, it becomes impossible to increase the upper limit values of the parameters configured in the base character.

Furthermore, once the frequency of fusion reaches the predetermined frequency, if the base character and the source material character are the same characters, then whenever this source material character is fused with the base character, the upper limit value (cap value) of the parameters configured in the base character before fusion cannot be further increased, but the benefits based on the properties configured in this source material character are provided to the player. If character fusion is performed in this manner, then the player cannot own the source material character and can continue to own only the base character. At the same time, the player can obtain benefits based on the properties of the source material character. Since in the present embodiment, as described above, the frequency of fusion is restricted to 3 times, whenever character fusion is repeated a fourth, fifth, sixth, . . . time, there is no more variation in the upper limit values (cap values) of the parameters configured in the base character, but the benefits based on the properties of the source material character are provided to the player.

In addition, in the present embodiment, the benefits based on the properties of the source material character differ depending on the class of rarity configured in the source material character. Specifically, when the class of rarity of the source material character is "Rare" or higher, the player is provided with game items. When the class of rarity of the source material character is "Uncommon" or lower, the player is provided with virtual medals as benefits.

In this manner, the advantages of character fusion can be continuously provided to the player before and after the preset condition is satisfied, and, therefore, it becomes possible to increase the advantages of repeatedly performing character fusion.

<Automatic Fusion>

In the game system 1 of the present embodiment, predetermined operations performed by the player enable automatic character fusion regardless of the player's operations when a character is provided to the player in a battle game or a lottery game. For this reason, as soon as the character is provided, upon determining whether or not this character is a source material character that can be fused with the base character, character fusion is carried out automatically. For this reason, it becomes possible to reduce the time and effort required for operation input by the player.

<<Operation of Game System 1>>

FIG. 9 is a flow chart used to illustrate an example of operation of the game system 1 in the present embodiment.

When the player performs an operation to initiate a lottery game, the player terminal 20 transmits a lottery game initiation request to the server device 10. When the server device 10 receives the lottery game initiation request transmitted from the player terminal 20, it carries out character provision processing (S101). Specifically, based on the character information shown in FIG. 4, the character provision processing unit 111 provides the player with a character selected from among multiple characters.

Next, when the character is provided to the player, the server device 10 determines whether or not character fusion has been set to automatic fusion (S102). Namely, by referring to the player information shown in FIG. 6, the determination processing unit 114 determines whether or not automatic fusion has been set to ON.

It should be noted that character fusion may be set to always perform automatic fusion without requiring the player to perform automatic fusion configuration in advance and having to perform determination processing in Step 102.

If as a result of such determination it is determined that automatic fusion is set to OFF (S102: NO), the routine advances to Step 104 and screen data generation processing is carried out. In other words, the screen data generation processing unit 116 generates screen data corresponding to a game screen including characters provided to the player.

On the other hand, if it is determined that automatic fusion is set to ON (S102: YES), the routine advances to Step 103 and character fusion processing is carried out. Below, an example of operation related to character fusion processing will be discussed in specific detail.

FIG. 10 is a flow chart used to illustrate character fusion processing.

First of all, the server device 10 carries out processing to determine whether or not it is possible to fuse the source material character with the base character. Namely, the determination processing unit 114 determines whether or not the character (source material character) provided to the player is a character identical to the base character specified by the player (S201). In the present embodiment, the determination as to whether the character is identical to the base character is carried out based on whether or not there is a match between the Character IDs.

If as a result of such determination it is determined that the character is not identical to the base character (S201: NO), the routine advances to Step 207 and update processing is carried out. Namely, the update processing unit 115 updates the proprietary character information shown in FIG. 7 by recording the character provided to the player as a proprietary character of the player in the storage unit 12.

On the other hand, if it is determined that the character is identical to the base character (S201: YES), then the routine advances to Step 202 and a determination is made as to whether or not the preset condition related to character fusion has been satisfied. Namely, by referring to the proprietary character information shown in FIG. 7, the determination processing unit 114 determines whether or not the frequency of fusion of the base character specified by the player has reached a maximum frequency (in the present embodiment, 3 times).

If as a result of such determination it is determined that the frequency of fusion of the base character has not reached the maximum frequency (S202: NO), the routine advances to Step 203 and parameter variation processing is carried out. Specifically, based on the character information shown in FIG. 4 and the proprietary character information shown in FIG. 7, the parameter variation processing unit 113A increases the upper limit values of the capability parameters configured in the base character from the current tier to the next tier. At such time, the parameter variation processing unit 113A can also increase the current values of the capability parameters configured in the base character. Subsequently, the routine advances to Step 207 and the update processing unit 115 updates the proprietary character information shown in FIG. 7 by reconfiguring new current upper limit values for the capability parameters configured in the base character without turning the character provided to the player into a proprietary character of the player.

On the other hand, if it is determined that the frequency of fusion of the base character has reached the maximum frequency (S202: YES), the routine advances to Step 204 without varying the capability parameters configured in the base character and it is determined whether or not the preset condition regarding the properties configured in the character provided to the player has been satisfied. Specifically, by referring to the character information shown in FIG. 4, the determination processing unit 114 determines whether or not the rarity configured in the character provided to the player is "Rare" or higher.

If based on the results of such determination it is determined that the rarity configured in the character provided to the player is "Rare" or higher (i.e., "Rare" or "Super-rare") (S204: YES), the routine advances to Step 205 and item provision processing is carried out. Specifically, based on the item information shown in FIG. 5, the benefit provision processing unit 113B provides the player with an item selected from among multiple items. Subsequently, the routine advances to Step 207 and update processing is carried out. Namely, the update processing unit 115 updates the proprietary item information shown in FIG. 8 by recording the item provided to the player as a proprietary item of the player in the storage unit 12 without turning the character provided to the player into a proprietary character of the player.

On the other hand, if it is determined that the rarity configured in the character provided to the player is less than "Rare" (i.e., "Uncommon" or "Common") (S204: NO), the routine advances to Step 206 and virtual medal provision processing is carried out. Namely, the benefit provision processing unit 113B provides the player with a predetermined number of virtual medals. Subsequently, the routine advances to Step 207 and update processing is carried out. Namely, the update processing unit 115 updates the player information shown in FIG. 6 by recording the virtual medals provided to the player in the storage unit 12 without turning the character provided to the player into a proprietary character of the player.

Next, going back to FIG. 9, when the character fusion processing is terminated in this manner, the server device 10 carries out screen data generation processing (S104). Namely, the screen data generation unit 116 generates screen data corresponding to a game screen related to the lottery game.

The server device 10 then transmits the thus generated screen data (HTML data) to the requesting player terminal 20 over a network. Upon receiving this screen data (HTML data) transmitted from the server device 10, the player terminal 20 analyzes the screen data and displays a game screen (web page) on the terminal display unit 24.

FIG. 11 is a diagram showing an example of the game screen 50 prior to character fusion. A game field area 51, a base character 52, and a source material character placement area 53 are displayed on the game screen 50. Along with displaying the base character 52 before fusion, the game field area 51 displays character information in connection with this base character 52. Here, "Character A" is configured as the base character 52 and Attack Power, Defense Power, and Physical Strength are displayed as the capability parameters of this "Character A". It is shown that for each parameter the upper limit value is "100" points and the current value is "80" points. Five characters, 54-58, which are provided to the player, are displayed in the source material character placement area 53.

FIG. 12 is a diagram illustrating an example of the game screen 50 showing how characters are fused. Here, the preset condition regarding character fusion has not been satisfied yet and the character 54 is "Character A", just like the base character 52, which is why it is automatically selected as the source material character. The automatically selected character 54 is moved from the source material character placement area 53, placed in the game field area 51, and then automatically fused with the base character 52.

FIG. 13 is a diagram showing an example of the game screen 50 after character fusion. Along with displaying "Character A", i.e., the base character 52 obtained after fusion, the game field area 51 displays character information in connection with the base character 52. Here, Attack Power, Defense Power, and Physical Strength are displayed as the capability parameters of "Character A". It is shown that for each parameter the upper limit value has increased to "200" points and the current value has increased to "110" points. Namely, it is shown that not only the current values, but also the upper limit values of the capability parameters configured in the base character 52 have increased as a result of the character fusion.

FIG. 14 is a diagram showing an example of the game screen 50 after providing an item. Here, the preset condition related to character fusion has been satisfied and "Item A", i.e. game item 59 provided to the player, is displayed in the game field area 51.

As described above, in the game system 1 of the present embodiment, a first advantage is provided to the player such that, once a source material character has been provided to the player, before a preset condition related to character fusion is satisfied, the upper limit value of parameters configured in a base character can be increased in a stepwise manner whenever this source material character is fused with the base character. On the other hand, a second advantage is provided to the player such that, once the preset condition related to character fusion has been satisfied, whenever this source material character is fused with the base character, the upper limit value of the parameters configured in the base character cannot be increased, but the player is provided with a benefit based on the properties configured in this source material character. Thus, the advantages of character fusion can be continuously provided to the player before and after the preset condition is satisfied, and, therefore, it becomes possible to increase the advantages of repeatedly performing character fusion.

Other Embodiments

The embodiments described above are intended to facilitate the understanding of the present invention and are not to be construed as limiting of the present invention. The present invention may be modified and improved without departing from the spirit thereof, and the present invention also includes equivalents thereto. In particular, the embodiments described below are also included in the present invention.

<Character Fusion>

In the present embodiment as described above, although the explanations are given with reference to a case in which character fusion becomes possible if the base character and the source material character are identical in Step 201 of FIG. 10, in which it is determined whether or not it is possible to fuse the source material character with the base character, the present invention is not limited thereto. For example, character fusion may be possible if the base character and the source material character are characters belonging to the same group, or alternatively, character fusion may be possible if these are different characters. As another example, character fusion may be performed when all the characters of many types pre-associated with the base character come into the player's possession.

In addition, in the present embodiment as described above, the explanations are given with reference to a case in which the upper limit values of the parameters configured in the base character are increased in a stepwise manner when the base character and the source material character are repeatedly fused before a preset condition related to character fusion is satisfied. The present invention, however, is not limited thereto. For example, the current values of the parameters configured in the base character may be increased in a stepwise manner all the way up to the upper limit values. Also, for example, the base character may be changed in a stepwise manner to base characters of different types by changing a Character ID associated with a base character before fusion to different Character IDs.

In addition, in the present embodiment as described above, the explanations are given with reference to a case in which, once the preset condition related to character fusion is satisfied, repeated fusion of the base character and the source material character results in the player being provided with benefits based on the properties configured in the source material character, although the upper limit values of the parameters configured in the base character cannot be further increased. The present invention, however, is not limited thereto. For example, after the preset condition is satisfied, whenever the base character and the source material character are fused, increasing the upper limit value of the capability parameters configured in the base character any further may not be possible, but the value of a likeability parameter configured in the base character may be increased in a stepwise manner as a benefit.

In addition, in the present embodiment as described above, although the explanations are given with reference to a case in which the player is provided with a single source material character and this single source material character is fused with the base character, the present invention is not limited thereto. For example, it is also applicable to cases in which two or more source material characters are provided to the player at once, such as in a special lottery game, and each source material character is fused with the base character in succession.

<Preset Conditions Related to Character Fusion>

In the present embodiment as described above, the explanations are given with reference to a case in which the preset condition related to character fusion is that the frequency of fusion reaches a predetermined frequency (e.g., a maximum frequency of 3), the present invention is not limited thereto. For example, the preset condition related to character fusion may be that character fusion is repeated in a configuration that has no limitations imposed on the frequency of fusion and the upper limit of the parameters configured in the base character reaches a cap value (maximum value).

<Automatic Fusion>

In the present embodiment as described above, automatic fusion is also applicable to cases in which multiple characters are provided to the player at once as a result of conducting a special lottery game. At such time, one character among the multiple characters provided to the player may be used for automatic fusion as a base character and the remaining characters among the multiple characters may be used for automatic fusion as source material characters.

<Character Provision Processing>

In the present embodiment as described above, the explanations are given with reference to battle games and lottery games as examples of character provision processing. The present invention, however, is not limited thereto. For example, characters may be provided when a mission given to the player is completed. In addition, characters may be provided when the player enters a serial code displayed on a web page, etc. Further, characters may be provided when the player logs in to the game system 1. Furthermore, characters may be provided in response to events (event point spending, higher ranking) supplied in the game system 1.

<Specifying Base Characters>

In the present embodiment as described above, the player may use a character specified by the player among the proprietary characters as a base character for fusion. In addition, a character automatically selected by the fusion processing unit 113 without any specifying input from the player may also be used as a base character for fusion.

<Server Device 10>

In the present embodiment as described above, the explanations are given with reference to a game system 1 equipped with a single server device 10 as an example of a service device. The invention, however, is not limited thereto and a game system 1 equipped with multiple server devices 10, as an example of server devices, may also be used. In other words, multiple server devices 10 may be connected over a network 2 and these server devices 10 may perform various types of processing in a distributed manner.

<Information Processing Device>

In the game system 1 used in the present embodiment as described above, the explanations are given with reference to a case in which various types of information processing are carried out by directing the server device 10 and the player terminals 20 to cooperate in with a game program. The invention, however, is not limited thereto and the above-mentioned various types of information processing may be carried out based on the game program using the server device 10 alone or the player terminals 20 alone as information processing devices.

In addition, a configuration may be used, in which the player terminals 20 support part of the information processing device functionality. In such a case, the server device 10 and the player terminals 20 constitute an information processing device.

It should be noted that the information processing device is an example of a computer equipped with a processor and a memory.

DESCRIPTION OF THE REFERENCE NUMERALS

1 Game system, 2 Network, 10 Server device, 11 Control unit, 12 Storage unit, 13 Input unit, 14 Display unit, 15 Communication unit, 20 Player terminal, 21 Terminal control unit, 22 Terminal storage unit, 23 Terminal input unit, 24 Terminal display unit, 25 Terminal communication unit, 50 Game screen, 51 Game field area, 52 Base character, 53 Source material character placement area, 54 Character, 55 Character, 56 Character, 57 Character, 58 Character, 59 Game item, 111 Character provision processing unit, 112 Battle processing unit, 113 Fusion processing unit, 113A Parameter variation processing unit, 113B Benefit provision processing unit, 114 Determination processing unit, 115 Update processing unit, 116 Screen data generation unit.

The invention claimed is:

1. An information processing device comprising:
   a processor, configured to execute one or more units, the one or more units comprising:
   a determination processing unit, which determines whether or not a preset condition related to fusing a basic first game content and a second game content used as source material for fusion has been satisfied; and a fusion processing unit which, before the preset condition is satisfied, varies parameters configured in the first game content each time the second game content is fused with the first game content, and, once the preset condition is satisfied, provides benefits comprising at least one of a game item and a virtual medal, without varying the parameters configured in the first game content, each time the second game content is fused with the first game content.

2. The information processing device according to claim 1, wherein the determination processing unit determines whether or not it is possible to fuse the second game content with the first game content and, based on the results of such a determination, determines whether or not the preset condition has been satisfied.

3. The information processing device according to claim 1, wherein, before the preset condition is satisfied, the fusion processing unit varies the upper limit of the parameters configured in said first game content in a stepwise manner each time game content that is identical to said first game content is fused, as the second game content, with the first game content.

4. The information processing device according to claim 1, wherein, once the preset condition is satisfied, the fusion processing unit provides benefits based on properties configured in the second game content each time the second game content is fused with the first game content.

5. The information processing device according to claim 4, wherein the fusion processing unit provides different benefits depending on the class of rarity configured in the second game content.

6. The information processing device according to claim 1, wherein there is further provided a game content provision processing unit providing game content selected from a plurality of types of game content, the determination processing unit determines whether or not the preset condition has been satisfied when the game content is provided by the game content provision processing unit, and the fusion processing unit automatically varies parameters configured in the first game content if it is determined by the determination processing unit that the preset condition has not been satisfied and automatically provides benefits if it is determined by the determination processing unit that the preset condition has been satisfied.

7. The information processing device according to claim 1, wherein the preset condition is that the frequency of fusion, at which the first game content and the second game content have been fused, has reached a predetermined frequency, or that the upper limit of the parameters configured in the first game content has reached a cap value.

8. A non-transitory computer-readable medium containing executable instructions for a game program, the instructions directing a processor to perform:
 determination processing, during which it is determined whether or not a preset condition related to fusing a basic first game content and a second game content used as source material for fusion has been satisfied; and
 fusion processing during which, before the preset condition is satisfied, parameters configured in the first game content are varied each time the second game content is fused with the first game content, and, once the preset condition is satisfied, benefits comprising at least one of a game item and a virtual medal are provided, without varying the parameters configured in the first game content, each time the second game content is fused with the first game content.

* * * * *